(12) United States Patent
Gallagher et al.

(10) Patent No.: US 8,386,451 B1
(45) Date of Patent: *Feb. 26, 2013

(54) SYSTEM AND METHOD OF MANAGING INTERNET BROWSER NAVIGATION

(75) Inventors: Jeffrey W. Gallagher, San Antonio, TX (US); Randal L. Schnedler, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/109,626

(22) Filed: May 17, 2011

Related U.S. Application Data

(63) Continuation of application No. 12/498,056, filed on Jul. 6, 2009, now Pat. No. 7,945,550, which is a continuation of application No. 11/034,382, filed on Jan. 12, 2005, now Pat. No. 7,558,776.

(60) Provisional application No. 60/539,394, filed on Jan. 27, 2004.

(51) Int. Cl.
*G06F 7/00* (2006.01)
*G06F 17/30* (2006.01)

(52) U.S. Cl. ........................ 707/705; 707/716

(58) Field of Classification Search ................ 707/311, 707/705, 716
See application file for complete search history.

(56) References Cited

U.S. PATENT DOCUMENTS

| | | | |
|---|---|---|---|
| 6,477,575 B1 | 11/2002 | Koeppel et al. | |
| 6,510,461 B1 | 1/2003 | Nielsen | |
| 6,615,247 B1 | 9/2003 | Murphy | |
| 6,823,330 B1 * | 11/2004 | Calvillo et al. | 1/1 |
| 6,985,953 B1 | 1/2006 | Sandhu et al. | |
| 7,188,176 B1 | 3/2007 | Nedderman et al. | |
| 7,359,977 B2 | 4/2008 | Lewis | |
| 2002/0023108 A1 | 2/2002 | Daswani et al. | |
| 2004/0128183 A1 * | 7/2004 | Challey et al. | 705/10 |
| 2005/0080804 A1 | 4/2005 | Bradshaw et al. | |
| 2006/0031759 A1 | 2/2006 | Brown et al. | |

* cited by examiner

*Primary Examiner* — Mariela Reyes
(74) *Attorney, Agent, or Firm* — Brooks, Cameron & Huebsch, PLLC

(57) ABSTRACT

The present invention provides a system and method of managing Internet browser navigation. Software code designed to interact with and control the user's Internet browser is embedded into web pages made available to remote users by a web server. Embedded software code is read by the user's Internet browser upon loading a requested web page. Embedded software code directs the browser to store one or more attributes upon the remote user's computer system. Stored attributes may then be compared to attributes embedded within subsequently requested web pages to determine if the requested web page, or a corrected web page, should be displayed.

20 Claims, 4 Drawing Sheets

SYSTEM AND METHOD OF MANAGING INTERNET BROWSER NAVIGATION

The present patent application is a Continuation Patent Application of U.S. patent application Ser. No. 12/498,056 filed Jul. 6, 2009, which is a Continuation Patent Application of U.S. patent application Ser. No. 11/034,382 filed Jan. 12, 2005, which is based upon and claims the benefit of U.S. Provisional Patent Application No. 60/539,394 filed Jan. 27, 2004.

FIELD OF THE INVENTION

The present invention relates generally to Internet browsers and, more particularly, to a system and method of managing Internet browser navigation.

BACKGROUND OF THE INVENTION

The Internet has emerged as a large community of electronically connected users located around the world who readily and regularly exchange significant amounts of information. The Internet continues to serve its original purpose of providing access an exchange of information among government agencies, laboratories, and universities for research and education. In addition, the Internet has evolved to serve a variety of interests and forums that extend beyond its original goals.

In its infancy, the Internet was designed to provide for the static exchange of information. As such, conventional browsers were sufficient in that they allowed the user to proceed forward and backward through a number of informational web pages without the need to reload each page from the server. In this manner, conventional web browsers allowed the user to retrace their steps through any number of visited web pages.

However, today's Internet provides much more than just static information. In fact, many 5 web based applications offer and/or require sensitive transactional information. For such web pages, use of conventional browser functionality may result in undesirable consequences.

There remains a need for a system and method capable of facilitating effective Internet navigation for transactional pages without the disadvantages associated with conventional browser functionality.

SUMMARY OF THE INVENTION

Accordingly, the present invention provides a system and method of managing Internet browser navigation. The present invention provides a web server designed to provide web pages to remote users via a computer network. Software code designed to interact with and control the user's Internet browser is created and embedded into web pages made available to the user by the web server. Embedded software code is read by the browser upon loading the web page requested by the remote user. In one embodiment, this software code directs the browser to store one or more attributes upon the remote user's computer system.

Stored attributes may then be compared to attributes embedded within subsequently requested web pages to determine if the requested web page should be displayed. In one embodiment, the requested web page is displayed if one or more of the compared attributes match. However, if a mismatch occurs, the browser is directed to request a corrected web page from the web server. In one embodiment, corrected web pages contain one or more informational statements designed to inform the user that their browser's functionality does not work on the displayed page and directs the user to make use of alternate functionality provided on the corrected page.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawing; it being understood that the drawings contained herein are not necessarily drawn to scale; wherein.

DETAILED DESCRIPTION OF THE INVENTION

Figure 1:
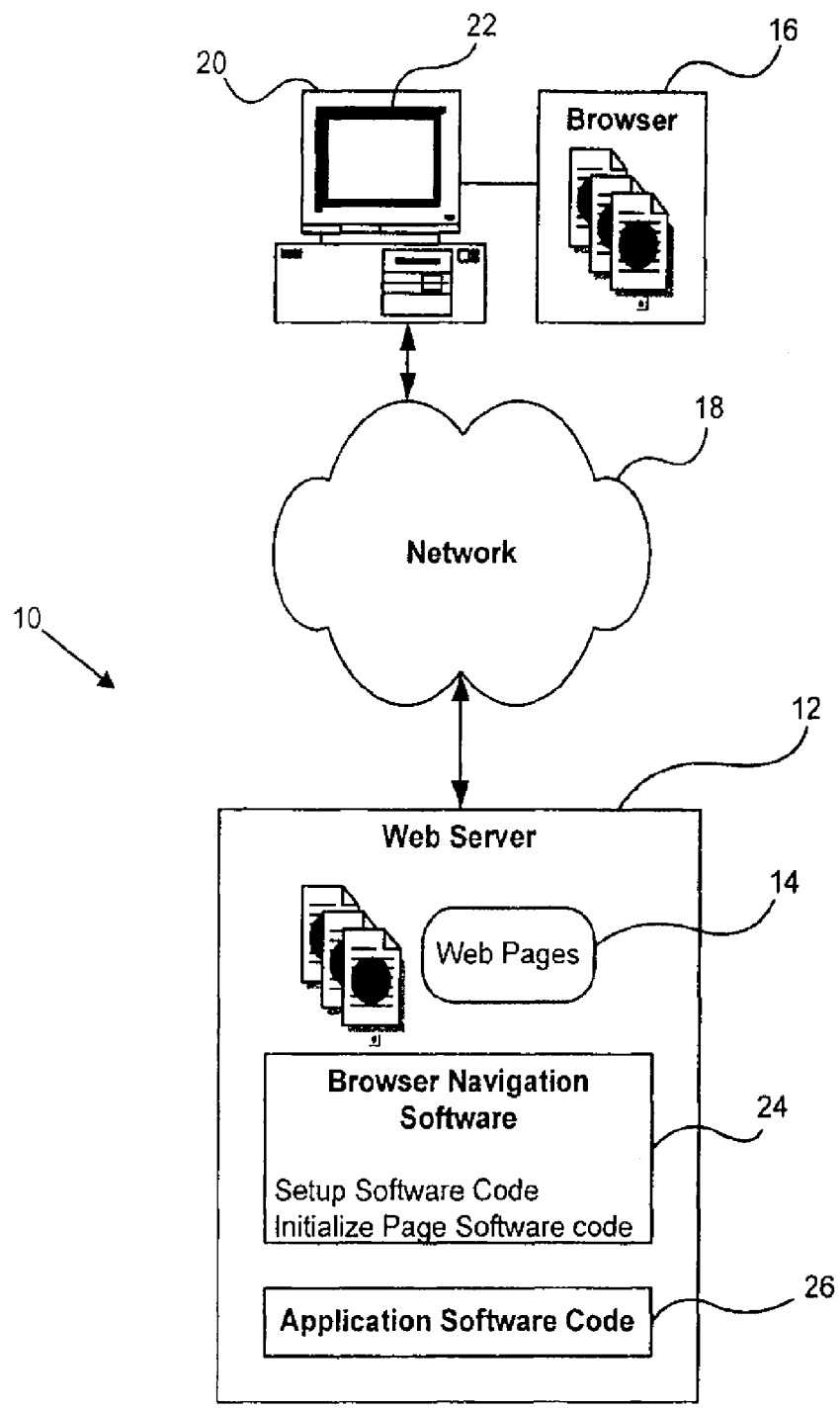
FIG. 1 is a component diagram illustrating one embodiment of the present invention.

The present invention is herein described as a system and method of managing browser navigation. The browser navigation system (10) of the present invention provides a web server (12) having access to a plurality of web pages (14). The web pages utilized by the web server of the present invention may be stored locally and/or accessed through an external storage medium (not shown). Web pages may be utilized to facilitate online interaction with one or more users. Such web pages may also be utilized to provide the user with the opportunity to engage in electronic commerce.

Access to the web pages provided by the web server of the present invention may be provided via a computer network (18). Further, firewalls (not shown) may be utilized to control access to the web server and/or protect the system against harmful viruses.

In one embodiment, the present invention interacts with an Internet browser (16) capable of connecting to the web server via a computer network. The present invention is capable of interacting with any number of Internet browser applications, including, but not limited to, those provided by Microsoft® and Netscape®. Further, any number of known computer systems (20) and/or electronic devices having Internet access capability may load and display the web pages provided by the present invention.

The web server (12) of the present invention is capable of managing the browser's interaction with the system. In one embodiment, an Advanced IBM Unix/websphere application server is utilized. In another embodiment, web server technology such as a server farm of Intel Pentium 4/MS Windows servers running Microsoft's IIS, or a Sun Microsystems EIOOOO/Solaris running IBM's websphere or BEA's web logic servers is utilized by the present invention to facilitate customer interaction. The graphic user interface (22) provided by the present invention is viewable by the user as presented by the Internet browser. In one embodiment, different JavaServerPage (JSP) templates are utilized by the web server (12) to build and display the interface (22) seen by the user.

In one embodiment, the web server of the present invention may contain any number of software packages designed to facilitate effective interaction with the user through his or her Internet browser. In one embodiment, the web server contains software code relating to individual business applications (26) as well as browser management software code (24) designed to support the interaction between browsers and individual web pages. In one embodiment, browser management software is created and made available to the web server. Such software may be embedded into individual web pages such that it accompanies each web page upon loading. In one embodiment, browser management software is designed to interact with and direct Internet browser behavior.

In one embodiment, browser management software is set up and initialized upon the web server prior to inclusion into individual web pages. In this manner, each web page provided to the Internet browser by the web server may be equipped with embedded software code capable of manipulating browser operation. Such code may be stored within the body of individual web pages and/or within the HTTP Header of individual pages.

The embedded software code provided by the present invention contains electronic information and/or instructions designed to direct the operation of the Internet browser. Such information may be utilized to direct the browser to take specific action and/or manipulate web page content upon loading a requested web page. In one embodiment, embedded software code may result in an alteration of the content ultimately displayed to the user via the graphic user interface. Software code embedded into individual web pages may also be utilized to instruct the browser regarding issues relating to web page caching. In one embodiment, each web page contains software code designed to instruct the web browser to automatically cache, i.e., store, each web page upon the user's system.

The unique functionality of the present invention may be selectively applied to particular web pages. In order to apply the unique functionality of the present invention to selected web pages, the embedded software code may contain one or more identifiers for the browser to consider upon web page retrieval. In short, an identifier may be placed within the embedded software code to enable the browser to determine which web pages will be subject to the enhanced browser navigation process of the present invention. Thus, in one embodiment, only those web pages having dynamic and/or transactional properties will have an identifier indicating that the web page is subject to the browser navigation process of the present invention.

Figure 2:
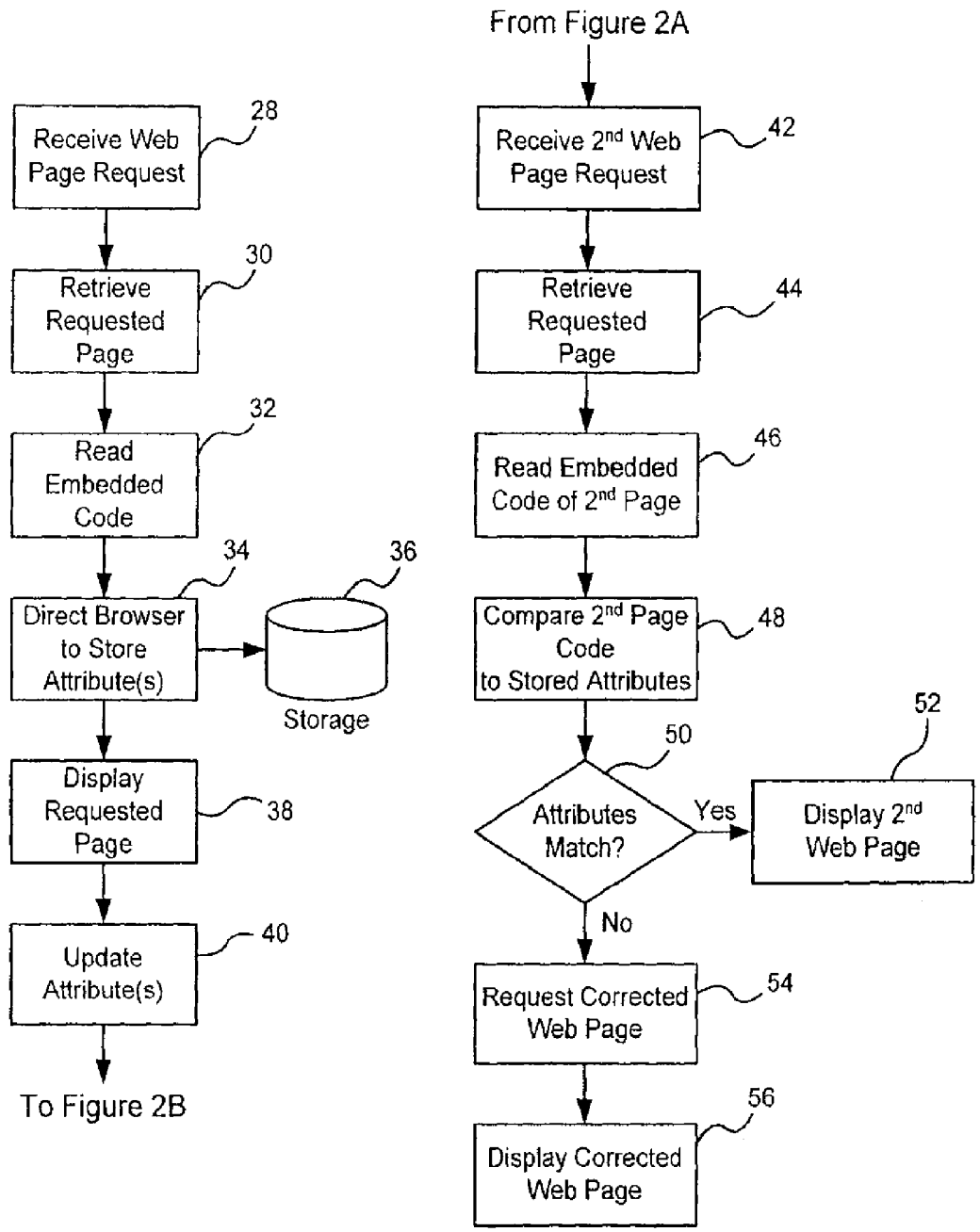
FIG. 2A is a process flow diagram illustrating the web page loading process of one embodiment of the present invention.
FIG. 2B is a process flow diagram illustrating the browser function management process of one embodiment of the present invention.

Referring to FIG. 2A, web pages containing embedded software code may be loaded for display upon the user's computer system upon request. When the user indicates that he or she would like to view a particular web page, the web server receives the request and retrieves the web page for loading upon the user's browser, as illustrated by Boxes (28) and (30). At this time, the embedded software code within the requested page is read by the user's Internet browser, as illustrated by Box (32). The browser then takes one or more actions as directed by the embedded software code.

In one embodiment, such actions may include the storage of one or more attributes associated with the requested web page, as illustrated by Boxes (34) and (36). In this context, attributes may be defined as software code having one or more values capable of distinguishing one web page from another. In one embodiment, attributes comprise a string of software code having a value capable of informing the browser whether to load a particular page or to request a corrected page from the web server, as discussed further below. Attributes may be stored within cookies placed upon and/or residing upon the user's computer system.

Once the embedded software code has been read and acted upon by the browser, the requested page is displayed upon the graphic user interface of the user's system, as illustrated by Box (38). At this time, any and all attributes stored upon the user's system are updated to reflect that the requested page has been displayed, as illustrated by Box (40) and explained in greater detail below.

Referring to FIG. 2B, when the user utilizes browser functionality, i.e., uses the back 5 button, forward button, refresh button, and/or bookmarks to request a second web page from the browser's history, the web server retrieves the second page to allow the user's browser to load it for viewing, as illustrated by Boxes (42) and (44). While the next page is being loaded, the browser, once again, reads any software code embedded within the requested page, as illustrated by Box (46).

If the browser navigation management process of the present invention is activated, the embedded software code of the requested page instructs the browser to compare the stored attributes previously deposited upon the user's system to the attributes embedded upon the newly requested page, as illustrated by Box (48). If one or more of the attributes match, the newly requested page is displayed by the browser, as illustrated by Boxes (50) and (52). In this example, the navigation management process of the present invention determined, through attribute comparison, that displaying the second page requested by the user will not adversely affect the business process offered by the web pages provided by the web server, as discussed in greater detail below.

In contrast, if no matches are found, the browser is instructed to request a corrected page from the web server, as illustrated by Box (54). The corrected web page may then be displayed for review by the user, as illustrated by Box (56).

Figure 3:
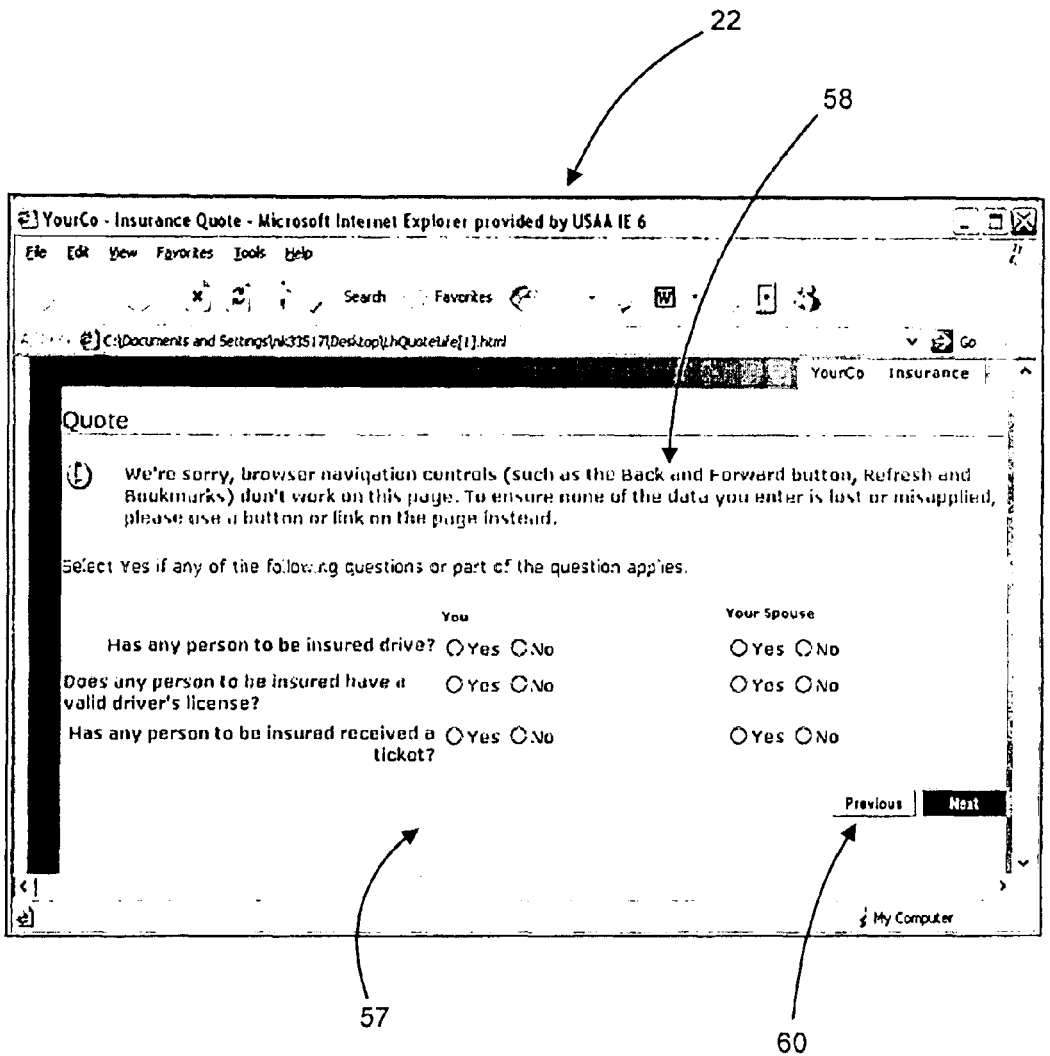
FIG. 3 is a screen shot of the graphic user interface of one embodiment of the present invention.

Referring to FIG. 3, in one embodiment, a corrected web page (57) provides one or more statements (58) to the user designed to inform them that the functionality provided by the Internet browser they are attempting to use is not available. For example, if the user tried to use the "back" button on their conventional Internet browser for a transactional web page, the corrected web page would be displayed instead of the web page requested by the user. This feature of the present invention protects the user from mistakes associated with using conventional browser functionality, such as double orders, "Page Expired" notices, etc.

The corrected web page (57) may also provide alternate navigation functionality. In one embodiment, the corrected web page provides alternate browser functionality (60) in the form of "previous" and "next" navigational buttons and/or links designed to allow the user to effectively navigate through the web pages provided by the web server. This feature of the present invention ensures that the user does not utilize conventional browser functionality to their detriment.

In one embodiment, attributes comprise a string whose value may be set to "true" or "false." The embedded code within a requested web page directs the browser to store this string within a cookie held upon the user's computer system. In one embodiment, cookies placed upon the user's local system are not persistent, i.e., they are stored upon the user's system temporarily and do not remain after the user logs off the web server provided by the present invention.

Once the page has been loaded, the value of the string held upon the user's system is set to "false" by the web server. Once the page has been displayed, the browser checks the attribute's value and changes it to "true." In one embodiment, this attribute updating action is done to set up a condition where a web page requested from browser cache will be able to determine that a requested web page has not been immediately provided by the server because the attribute value has been set to "true." In this example, the browser would be directed to compare the attributes of the requested page to those stored upon the user's system. If the attributes do not match, a corrected page is requested from the server.

In one embodiment, time stamps may also be utilized to assist in making a determination as to whether a requested page or a corrected page should be loaded. In one embodiment, each requested page is equipped with a time stamp indicating when the page was first provided from the server. Further, code embedded within the requested web page may be utilized to instruct the browser to store a timestamp associated with the web page upon the user's system.

This feature of the present invention allows the time stamp held within the cookie upon the user's system to be compared to the time stamp within the embedded code of a newly requested page. In this example, the value of the cookie would be the time stamp of the last page provided by the server. If the compared time stamps do not match, the browser may request a corrected page.

Further, if the user utilizes a conventional browser function, i.e., back, forward, refresh, home, etc., in an attempt to reach a cached web page, the browser is instructed to compare the time stamp of the cached page to the time stamp found in the cookie stored upon the user's system. Again, if the time stamps in this example do not match, the browser is instructed to request a corrected web page.

Figure 4:
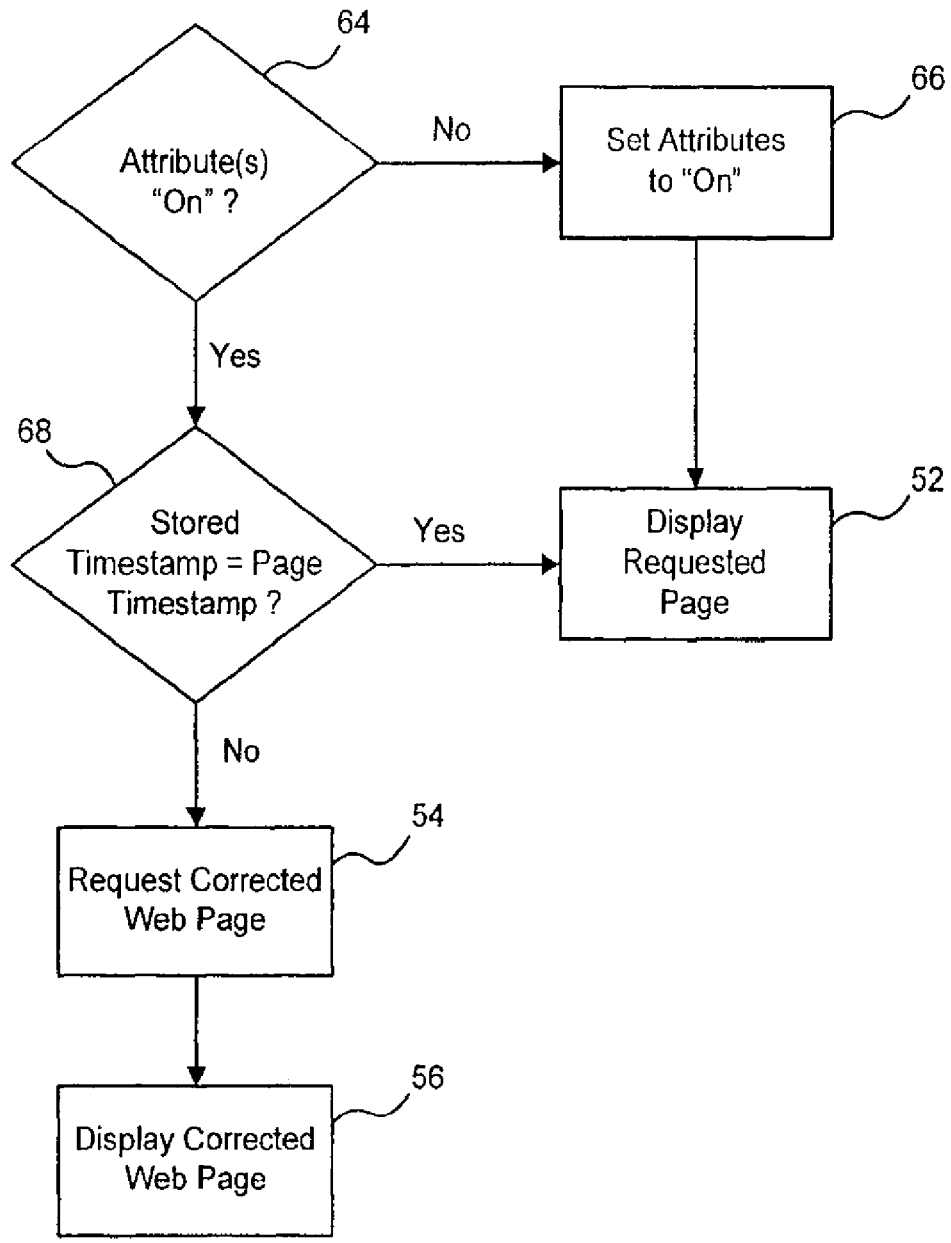
FIG. 4 is a process flow diagram illustrating the attribute comparison process of one embodiment of the present invention.

Referring to FIG. 4, embedded browser navigation software code may be applied selectively to individual web pages. As such, attributes stored upon the user's local system may be turned "on" or "off" by software code found within subsequently requested web pages. In one embodiment, an "on the fly" determination may be made by the web page software code, the web server, and/or the browser as directed by the embedded code, as to whether attribute(s) shall be "on" or "off", given the type of web page requested. In this example, an inactive attribute, i.e., having an "off" designation, would not initiate the comparison step described above, thus allowing the user to utilize conventional browser functions without attribute comparison.

Boxes (64) and (66) illustrate an example of where the attribute status is checked by the browser and changed, if necessary, to an active designation to facilitate the comparison process of the present invention. In one embodiment, transactional web pages having input fields or providing data communication relating to a business process may be predefined by the system as having active attributes, i.e., having an "on" designation. Transactional pages include, but are not limited to, form input pages for entering data, verify pages for verifying data, and results/confirmation pages including electronic checkouts and/or receipt displays. In some cases, the factual circumstances surrounding a potential business transaction will dictate the order and content of web pages provided to the user.

If the attribute is active and the stored attribute timestamp matches the timestamp on the newly requested page, the requested page is displayed, as illustrated by Boxes (68) and (52). However, if a mismatch occurs, a corrected page is requested from the server and displayed instead, as illustrated by Boxes (68), (54), and (56).

In one embodiment, web page URL addresses corresponding to corrected web pages are included as part of the embedded code within requested web pages. This feature of the present invention allows the browser to request a specific URL from the web server whenever a mismatch occurs, resulting in improved communication between the browser and the web server.

Although the invention has been described with reference to specific embodiments, this description is not meant to be construed in a limited sense. Various modifications of the disclosed embodiments, as well as alternative embodiments of the invention, will become apparent to persons skilled in the art upon reference to the description of the invention. It is, therefore, contemplated that the appended claims will cover such modifications that fall within the scope of the invention.

The invention claimed is:

1. A method of managing browser navigation, comprising:
receiving, at a browser executing on a computing system, a first web page having a first embedded software code;
executing the first embedded software code to store a first navigation attribute;
receiving a request to navigate to a second web page having a second embedded software code;
loading the second web page to execute the second embedded software code to determine a second navigation attribute;
requesting a corrected second web page if the second navigation attribute fails to match a condition set by the first navigation attribute;
providing a second navigation control in the corrected second web page; and
requesting subsequent corrected web pages if a subsequent navigation attribute fails to match a condition set by the second navigation attribute.

2. The method of claim 1, further comprising receiving the request to navigate to the second web page from a navigation control provided by the browser.

3. The method of claim 1, further comprising providing an indication in the corrected second web page that the navigation control provided by the browser is disabled.

4. The method of claim 2, further comprising providing navigation using both the navigation control provided by the browser and a first navigation control provided within the first web page.

5. The method of claim 1, further comprising receiving the request to navigate to the second web page from a first navigation control within the first web page.

6. The method of claim 1, further comprising selectively comparing the second navigation attribute to the first navigation attribute in accordance with an identifier embedded in the first web page.

7. The method of claim 1, further comprising storing the first navigation attribute in a cache on the computing system.

8. A method of providing navigation control between related web pages, comprising:
receiving, at a web server, a request for a first web page;
providing the first web page having a first embedded software code that is executed by a client computing device to store a first navigation attribute on the client computing device;
receiving a request at the web server to navigate to a second web page;
providing the second web page having a second embedded software code that is executed by the client computing device to determine a second navigation attribute;
requesting a corrected second web page based on a result of a comparison between the second navigation attribute and the first navigation attribute;
providing a second navigation control in the corrected second web page; and requesting subsequent corrected web pages if a subsequent navigation attribute fails to match a condition set by the second navigation attribute.

9. The method of claim 8, further comprising storing the first navigation attribute in a cache on the computing system, wherein the cache is a cookie file.

10. The method of claim 8, wherein the first navigation attribute is one of a string value, a time stamp, or a Boolean function.

11. The method of claim 8, wherein the second embedded software code when executed by the computing device requests a Uniform Resource Locator (URL) from a web server to retrieve the corrected second web page.

12. The method of claim 8, further comprising providing an alternate navigation functionality within web pages received at a browser to navigate between the web pages without utilizing a navigation control provided by the browser, the alternate navigation functionality being provided through embedded software code in the web pages.

13. The method of claim 8, further comprising receiving the request at the server in response to a browser navigation control provided by a web browser executing on the client computing device.

14. A method of providing navigation control between a first web page and a second web page, comprising:
executing, within a browser application executing on a computing device, first embedded software code associated with the first web page to store a first navigation attribute in a cookie file;
communicating a request for the second web page through the browser application;
communicating a request for a corrected second web page having an indication that the navigation control provided by the browser is disabled if a second navigation attribute fails to match a condition set by the first navigation attribute;
providing a second navigation control in the corrected second web page; and
requesting subsequent corrected web pages if a subsequent navigation attribute fails to match a condition set by the second navigation attribute.

15. The method of claim 14, further comprising
providing an indication that the corrected second web page has been provided to the client computing device; and
providing an indication that an alternate navigation functionality between the related web pages is being provided as an alternative to the browser navigation control.

16. The method of claim 14, further comprising selectively comparing the second navigation attribute to the first navigation attribute in accordance with an identifier embedded in the first web page.

17. The method of claim 14, further comprising storing the first navigation attribute in a persistent file on the client computing device.

18. The method of claim 14, wherein the second web page includes second embedded software code that requests a predetermined Uniform Resource Locator (URL) from a web server to retrieve the corrected second web page based on an identifier provided with the first web page.

19. The method of claim 14, wherein the condition is determined based on the first navigation attribute being one of a string value, a time stamp, or a Boolean function.

20. The method of claim 14, wherein the request for the second web page is made through a browser functionality.

* * * * *